United States Patent
Moreau

(10) Patent No.: US 7,556,387 B2
(45) Date of Patent: Jul. 7, 2009

(54) CONFORMABLE RETROREFLECTIVE FILM STRUCTURE

(75) Inventor: Leo Moreau, Broad Brook, CT (US)

(73) Assignee: Reflexite Corporation, Avon, CT (US)

( * ) Notice: Subject to any disclaimer, the term of this patent is extended or adjusted under 35 U.S.C. 154(b) by 0 days.

(21) Appl. No.: 12/148,973

(22) Filed: Apr. 24, 2008

(65) Prior Publication Data

US 2008/0198460 A1    Aug. 21, 2008

Related U.S. Application Data

(63) Continuation of application No. 11/728,722, filed on Mar. 27, 2007, now Pat. No. 7,374,297.

(60) Provisional application No. 60/788,081, filed on Mar. 31, 2006.

(51) Int. Cl.
*G02B 5/124* (2006.01)
*B32B 3/00* (2006.01)

(52) U.S. Cl. ............... 359/530; 359/529; 359/900; 428/161; 428/424.6; 428/518

(58) Field of Classification Search ............... None
See application file for complete search history.

(56) References Cited

U.S. PATENT DOCUMENTS

| 5,888,618 | A | 3/1999 | Martin |
| 2002/0115808 | A1 | 8/2002 | Peloquin et al. |
| 2007/0223092 | A1* | 9/2007 | Moreau ............... 359/529 |
| 2007/0236795 | A1 | 10/2007 | Moreau |

* cited by examiner

*Primary Examiner*—James Phan
(74) *Attorney, Agent, or Firm*—Nixon Peabody LLP

(57) ABSTRACT

The present invention includes conformable retroreflective structures. In some embodiments, the conformable retroreflective structures are also shrink resistant. The conformable retroreflective structures include a transparent plasticized polyvinyl chloride film having a first side and a second side; a first transparent polymer layer overlying the first side of the plasticized polyvinyl chloride film; a second transparent polymer layer overlying the second side of the plasticized polyvinyl chloride film; an array of retroreflective cube-corner elements underlying the second transparent polymer layer; and a plasticizer resistant adhesive underlying the array of retroreflective cube-corner elements. In some embodiments, the first and second transparent polymer layers are transparent, radiation-cured polymer layers.

6 Claims, 1 Drawing Sheet

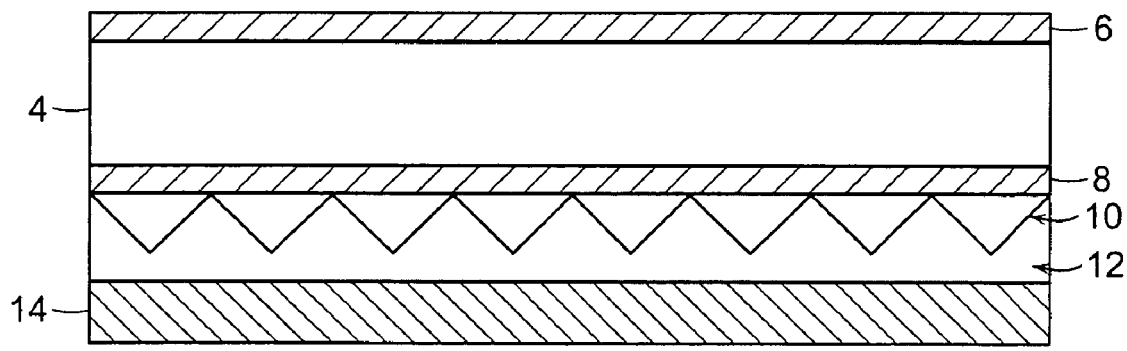

CONFORMABLE RETROREFLECTIVE FILM STRUCTURE

RELATED APPLICATION

This application is a continuation of U.S. application Ser. No. 11/728,722 filed Mar. 27, 2007, now U.S. Pat. No. 7,374, 297, which claims the benefit of U.S. Provisional Patent Application No. 60/788,081, filed on Mar. 31, 2006, the entire teachings of which are incorporated herein by reference.

BACKGROUND OF THE INVENTION

Retroreflective materials are employed for various safety and decorative purposes. Particularly, these materials are useful at nighttime when visibility is important under low light conditions. With perfect retroreflective materials, light rays are reflected essentially towards a light source in a substantially parallel path along an axis of retroreflectivity. Retroreflective materials can be used as reflective tapes and patches for clothing such as vests and belts. Also, retroreflective materials can be used on posts, barrels, traffic cone collars, highway signs, vehicles, warning reflectors, etc. Retroreflective material can include arrays of randomly oriented micron diameter spheres or close packed cube-corner (prismatic) arrays.

Cube-corner or prismatic retroreflectors are described, for example, in U.S. Pat. No. 3,712,706, issued to Stamm on Jan. 23, 1973, the teachings of which are incorporated by reference herein. Generally, the prisms can be made by forming a master negative die on a flat surface of a metal plate or other suitable material. To form the cube-corner elements, three series of parallel equidistance intersecting V-shaped grooves 60 degrees apart are inscribed in the flat plate. The die is then used to process the desired cube-corner array into a rigid flat plastic surface.

Further details concerning the structures and operation of cube-corner microprisms can be found in U.S. Pat. No. 3,684, 348, issued to Rowland on Aug. 15, 1972, the teachings of which are incorporated by reference herein. A method for making retroreflective sheeting is also disclosed in U.S. Pat. No. 3,689,346 issued to Rowland on Sep. 5, 1972, the teachings of which are incorporated by reference herein. For example, cube-corner microprisms can be formed in a cooperatively configured mold. The prisms can be bonded to sheeting, which is applied thereover to provide a composite structure in which the cube-corner elements project from one surface of the sheeting.

Adhesively mounted retroreflective materials are prone to wrinkling when applied to contoured surfaces. In some instances, it has been necessary to cut a retroreflective structure to a specific geometry to prevent wrinkles when the retroreflective structure was applied to a contoured surface. In addition, many adhesively mounted retroreflective materials have been susceptible to shrinkage. The problems of wrinkling and shrinkage have heretofore hindered the application of retroreflective materials to contoured surfaces.

SUMMARY OF THE INVENTION

The present invention includes conformable retroreflective structures. The conformable retroreflective structures include a transparent plasticized polyvinyl chloride film having a first side and a second side; a first transparent polymer layer overlying the first side of the plasticized polyvinyl chloride film; a second transparent polymer layer overlying the second side of the plasticized polyvinyl chloride film; an array of retroreflective cube-corner elements underlying the second transparent polymer layer; and a plasticizer resistant adhesive underlying the array of retroreflective cube-corner elements. In some embodiments, the first and second transparent polymer layers are transparent, radiation-cured polymer layers.

A "conformable" retroreflective structure can be adhered to contoured curved surfaces of a substrate without the formation of significant wrinkles and, in some embodiments, can be adhered to contoured curved surfaces of a substrate without the need to cut the retroreflective structure to specific geometries to prevent wrinkles. "Conformable" refers to a property of the retroreflective structures. The present invention is not limited to retroreflective structures for application to any particular substrate geometry. For example, the conformable retroreflective structures of the present invention can be applied to flat, contoured, or curved substrates.

In some instances, the conformable retroreflective structures include a transparent plasticized polyvinyl chloride film having a first side and a second side; a first transparent, radiation-cured polymer layer overlying the first side of the plasticized polyvinyl chloride film; a second transparent, radiation-cured polymer layer overlying the second side of the plasticized polyvinyl chloride film; an array of retroreflective cube-corner elements underlying the second transparent, radiation-cured coating layer; a metallized reflective layer deposited on the array of retroreflective cube-corner elements; and a crosslinked, plasticizer-resistant acrylic adhesive bonded to the metallized reflective layer.

In one aspect of the invention, a conformable retroreflective structure includes a transparent plasticized polyvinyl chloride film having a first side and a second side; a first transparent polyurethane layer overlying the first side of the plasticized polyvinyl chloride film, wherein the first polyurethane layer has a thickness of about 0.0004 to about 0.0009 inches (about 0.01 to about 0.023 mm); a second transparent polyurethane layer overlying the second side of the plasticized polyvinyl chloride film wherein the second transparent polyurethane layer has a thickness of about 0.0004 to about 0.0009 inches (about 0.01 to about 0.023 mm); an array of retroreflective cube-corner elements underlying the second transparent, radiation-cured coating layer; and a crosslinked, plasticizer-resistant acrylic adhesive underlying the array of retroreflective cube-corner elements.

In some embodiments, the conformable retroreflective structures are also shrink resistant. "Shrink resistant," as that term is used herein, refers to a property of a retroreflective structure wherein the retroreflective structure can substantially maintain its original dimensions. In some embodiments, the retroreflective structures are shrink resistant and maintain their original dimensions even after various types of use, for example, use in the outdoors.

Conformable retroreflective structures of the present invention can be used, for example, as a retroreflective vehicle graphics film for improved nighttime vehicle conspicuity. In some embodiments, the conformable retroreflective structures can be applied to non-contoured or contoured curves of motor vehicles without creating substantial wrinkles or other aesthetic defects. In some instances, the conformable retroreflective structures are shrink resistant and do not experience the shrinkage normally associated with conventional adhesively mounted plasticized polyvinyl chloride based film products.

BRIEF DESCRIPTION OF THE DRAWINGS

The foregoing will be apparent from the following more particular description of example embodiments of the invention, as illustrated in the accompanying drawing in which like reference characters refer to the same parts throughout the different views.

The drawing is not necessarily to scale, emphasis instead being placed upon illustrating embodiments of the present invention.

The FIGURE is a cross sectional view of a retroreflective structure according to one embodiment of the present invention.

DETAILED DESCRIPTION OF THE INVENTION

A description of example embodiments of the invention follows.

Generally, the conformable retroreflective structures of the present invention include a transparent plasticized polyvinyl chloride film having a first side and a second side; a first transparent polymer layer overlying the first side of the plasticized polyvinyl chloride film; a second transparent polymer layer overlying the second side of the plasticized polyvinyl chloride film; an array of retroreflective cube-corner elements underlying the second transparent polymer layer; and a plasticizer resistant adhesive underlying the array of retroreflective cube-corner elements.

The FIGURE illustrates an embodiment of the present invention. Conformable retroreflective structure 2 includes transparent plasticized polyvinyl chloride film 4. Suitable transparent plasticized vinyl films can be manufactured, for example, by calendaring, extrusion, solvent casting, or other methods known in the art. Polyvinyl chloride film 4 can contain various colorants and performance additives well-known to those of skill in the art. In one embodiment, the film is a calendered film. Calendaring can be an especially useful method due to the flexibility of the calendaring process to compound colorants and performance enhancement additives.

Polyvinyl chloride film 4 is substantially transparent. In some embodiments, Polyvinyl chloride film 4 is substantially transparent to visible light. Polyvinyl chloride film 4 can be either clear or transparently colored. In some embodiments, the polyvinyl chloride film includes a fluorescent dye.

Polyvinyl chloride film 4 can have a thickness, for example, of about 0.001 to about 0.022 inches (about 0.025 to about 0.56 millimeters (mm)) such as about 0.004 to about 0.020 inches (about 0.1 to about 0.51 mm), about 0.004 to about 0.01 inches (about 0.1 to about 0.25 mm), about 0.006 to about 0.01 inches (about 0.15 to about 0.25 mm), or about 0.006 to about 0.018 inches (about 0.15 to about 0.46 mm). The thickness of the base film can be selected based on the flexibility, tear resistance, and color stability desired for any particular application. Furthermore, the selected film thickness of the structure can be selected based on the desired long-term weatherability characteristics of the structure. In general, thinner layers of polyvinyl chloride films are preferred. However, if the vinyl film is too thin, then the structure will lose it conformability because the prism stiffness will dominate. However, a thinner finished product, and therefore a thinner vinyl film, is desirable when improved flexibility and/or raw materials cost are more important. For example, in preferred embodiments, the polyvinyl chloride film has a thickness about 0.004 to about 0.01 inches (about 0.1 to about 0.25 mm), with a preferred range being from 0.004-0.02 inch, including but not limited to e 0.012-0.018 inch, with some possibility that decreased thickness is preferred as color stability of additives improves. The selected thickness can be important as it can affect the ability of the retroreflective structure to conform to a contoured surface. Furthermore, the thickness of the film can affect the long-term weatherability characteristics of the structure. Therefore, the selected thickness of the transparent plasticized polyvinyl chloride film can be determined, for example, based on conformability and weatherability requirements for any particular application.

The transparent plasticized polyvinyl chloride film has a Shore A hardness, for example, of about 25 to about 60 such as about 30 to about 50, about 30 to about 45, or about 35 to about 40. In one particular embodiment, the transparent plasticized polyvinyl chloride film has a Shore A hardness of about 36. Shore A hardness is a measure of the relative hardness of a material and can be determined with an instrument called a Shore A durometer.

Examples of suitable polyvinyl chloride film include a polyvinyl chloride film available from American Renolit Corporation under the trademark RENOLIT® (Whippany, N.J.), or a calendered plasticized polyvinyl chloride film available from Achilles USA, Everett, Wash.

In addition to transparent plasticized polyvinyl chloride film 4, conformable retroreflective structure 2 also contains at least two transparent, polymer layers. Transparent plasticized polyvinyl chloride film 4 has a first side and a second side. First transparent polymer layer 6 overlies the first side of plasticized polyvinyl chloride film 4. "Overlies" and "overlying" refer to the relative orientation of the polymer layer to the plasticized polyvinyl chloride film. In some embodiments, one or more layers of material lie between the first transparent polymer layer and the plasticized polyvinyl chloride film. In one particular embodiment, the first transparent polymer layer is directly attached to the plasticized polyvinyl chloride film. Second transparent polymer layer 9 underlies the second side of plasticized polyvinyl chloride film 4. "Underlies" and "underlying" refer to the relative orientation of the polymer layer to the plasticized polyvinyl chloride film. In some embodiments, one or more layers of material lie between the second polymer layer and the plasticized polyvinyl chloride film. In one particular embodiment, the second transparent polymer layer is directly attached to the plasticized polyvinyl chloride film.

First transparent polymer layer 6 and/or second transparent polymer layer 8 can be formed from a formulation that includes a urethane acrylate prepolymer. In one embodiment, a urethane acrylate prepolymer, e.g., a linear polyether urethane acrylate prepolymer, is the majority component of the formulation from which the transparent polymer layer is formed. In some instances, the molecular weight of the urethane acrylate prepolymer can be greater than about 1000 grams/mole such as, for example, about 1000 to about 6000 grams/mole or about 2000 to about 4000 grams/mole. The acrylate moiety functionality of the prepolymer can be, for example, about 1 to about 6. In a preferred embodiment, the desired acrylate moiety functionality is about 1.2 to about 3. Functionality refers to the average number of reactive acrylate end groups per molecule. The polyurethanes can be aliphatic or aromatic. However, typically, aliphatic polyurethanes are preferred over aromatic polyurethanes because retroreflective structures containing aliphatic polyurethanes can have better weatherability characteristics. Thus, in one embodiment, first transparent polymer layer 6 and/or second transparent polymer layer 8 include an aliphatic polyurethane acrylate.

Suitable linear polyether urethane acrylate prepolymers include, but are not limited to, BR5825, BR5824, BR582, BR543 and BR541 available from Bomar Specialties Co. (Winsted, Conn.).

The formulations for the transparent polymer layers also can contain other prepolymers for such functions as viscosity modification, adhesion promotion, tack reduction, and other purposes. Examples of monofunctional prepolymers that can be used for viscosity modification include, but are not limited to, isobornyl acrylate; 2(2-ethoxyethoxy) ethyl acrylate; tridecyl acrylate; octyldecyl acrylate; 2-phenoxyethyl acrylate; 2-phenoxyethyl methacrylate; alkoxylated lauryl acrylate; lauryl acrylate; lauryl methacrylate; isodecyl acrylate; stearyl acrylate; and stearyl methacrylate. Examples of multifunctional prepolymers that can be used for viscosity modification include, but are not limited to, trimethylolpropane triacrylate; trimethylolpropane trimethacrylate; ethoxylated trimethylolpropane trimethacrylate; propoxylated trimethylolpropane triacrylate; and propoxylated glyceryl triacrylate Additional prepolymers that can be used for additional functional benefits include, but are not limited, to epoxy acrylates; brominated epoxy acrylates; polyester acrylates; silicone acrylates; fluoroacrylates; and polybutadiene acrylates.

First transparent polymer layer 6 and/or second transparent polymer layer 8 can include a radiation-cured polymer, e.g., an ultraviolet (UV) cured polymer. In some embodiments, either or both of first transparent polymer layer 6 and second transparent polymer layer 8 include radiation-cured polyurethane such as, for example, UV-cured polyurethane acrylate.

In some embodiments, one or more of the first and second transparent polymer layers are radiation-cured. In general, a photoinitiator is needed to cure a radiation-curable formulation. Examples of photoinitiators that can be used include, but are not limited to, benzyldimethylketal; 2-hydroxy-2-methyl-1-phenyl-1-propanone; alpha-hydroxycylohexylphenyl ketone; benzophenone; 2,4,6-trimethylbenzoylphenyl phosphineoxide; isopropylthioxanthone, ethyl-4-dimethylamino benzoate; 2-ethyl-4-dimethyl amino benzoate; oligo [2-hydroxy-2-methyl-1-[4-(1-methylvinyl)phenyl]propanone]; difunctional alpha-hydroxy ketone; 1-[4-94-benzoylphenyl-sulfanyl) phenyl]-2-methyl-2-(4-methylphenylsulfonyl) propan-1-one; 2-methyl-1[4-(methylthio)phenyl]-2-morpholinopropane-1-one; phenylbis (2,4,6-trimethylbenzoyl)-phosphine oxide); 2,2-dimethoxy-1,2-diphenylethan-1-one; 2,2-diethoxy-1-phenyl-ethanone; and combinations thereof.

In particular embodiments, the first and/or second transparent radiation-cured polymer layers are formed from compositions which include aliphatic urethane acrylate prepolymer, monofunctional acrylate prepolymer, multifunctional acrylate prepolymer, and a photoinitiator or a blend of photoinitiators.

In some embodiments, either or both of first transparent polymer layer 6 and second transparent polymer layer 8 include a solvent or water-based polyurethane. In some instances, first transparent polymer layer 6 and/or second transparent polymer layer 8 include at least one polyurethane selected from the group consisting of polyether polyurethanes, polyester polyurethanes, and polycarbonate polyurethanes. The polyurethanes can be aliphatic or aromatic. However, typically, aliphatic polyurethanes are preferred over aromatic polyurethanes because retroreflective structures containing aliphatic polyurethanes can have better weatherability characteristics.

Transparent polymer layers having aliphatic polyether polyurethane can be made using various aliphatic diisocyanates such as, for example, isophorone diisocyanate (IPDI), hexamethylene diisocyanate (HDI), HMDI (HMDI being a 4,4'-dicyclohexylmethane diisocyanate) and tetramethylene xylene diisocyanate (TMXDI). Transparent polymer layers having aliphatic polyester polyurethane can be made, for example, using any one of numerous polyester diols known in the art. Transparent polymer layers having aliphatic polycarbonate polyurethane can be made, for example, using polycarbonate diols.

First transparent polymer layer 6 and second transparent polymer layer 8 can have the same or different compositions. For example, first transparent polymer layer 6 can include any of the polymer compositions described supra while second transparent polymer layer 8 can include any other polymer composition.

In one embodiment, the first transparent, radiation-cured polymer layer has a thickness of about 0.0002 to about 0.001 inches (about 0.0051 to about 0.025 mm). In other embodiments, the first transparent, radiation-cured polymer layer has a thickness of about 0.0004 to about 0.0009 inches (about 0.01 to about 0.023 mm).

The second transparent, radiation-cured polymer layer can have a thickness of about 0.004-0.009 inches.

In some embodiments, the retroreflective structure includes one or more transparent polymer layers with a thickness of about 0.0001 inches (in.) (about 0.0025 mm) to about 0.0015 in. (about 0.038 mm), such as about 0.0002 in. (about 0.0051 mm) to about 0.0013 in. (about 0.033 mm), about 0.0002 in. (about 0.0051 mm) to about 0.001 in. (about 0.025 mm), about 0.0005 in. (about 0.013 mm) to about 0.001 in. (about 0.025 mm), about 0.0004 in. (about 0.01 mm) to about 0.0009 in. (about 0.023 mm), or about 0.0007 in. (about 0.018 mm). The first and second transparent polymer layers can have the same thickness or, in some instances, can have different thicknesses.

The retroreflective structures of the present also include an array of retroreflective cube-corner elements. Generally, retroreflective structure 2 includes array of retroreflective cube-corner elements 10 underlying second transparent polymer layer 8. "Underlying" refers to the relative orientation of the retroreflective cube-corner elements to the second transparent polymer layer. In some embodiments, one or more layers of material lie between the second transparent polymer layer and array of retroreflective cube-corner elements.

Second transparent polymer layer can provide a substrate for the array of retroreflective cube-corner elements. In one embodiment, the array of retroreflective cube-corner elements is attached to the second transparent polymer layer. Generally, the array of retroreflective cube-corner elements has a window side exposed to incoming light rays and an opposite, facet side. The array of retroreflective cube-corner elements can be oriented such that the window side faces the second transparent polymer layer. For example, window side of the array of retroreflective cube-corner elements can be attached to the second transparent polymer layer. In some embodiments, the array of retroreflective cube-corner elements is attached to the second transparent polymer layer using a transparent adhesive. Alternatively, the array of retroreflective cube-corner elements can be attached to the second transparent polymer layer using a transparent coating such as a transparent coating formed from a radiation-curable or solvent or water based coating formulation. In one embodiment, the array of retroreflective cube-corner elements can be cast directly onto the second transparent polymer layer.

Array of retroreflective cube-corner elements 10 can be formed of a polymer, e.g., a substantially transparent polymer. After being formed into the array of retroreflective cube-corner elements, the polymer is preferably rigid, or substantially inflexible, at room temperature. The rigidity of the polymer in the array allows the cube-corner elements to maintain their optical characteristics. The polymer can also be non-extensible, which is defined as not being capable of being substantially stretched without breaking. The polymer can be selected from a wide variety of polymers which include, but are not limited to, urethane, acrylic acid esters, cellulose esters, ethylenically unsaturated nitriles, hard epoxy acrylates, etc. Other polymers include polycarbonates, polyesters and polyolefins, acrylate silanes, hard polyester urethane acrylates. Other polymers, which are not as rigid, can also be used. These polymers include polyvinyl chloride and polyvinylidene chloride. Preferably, the polymer is cast in a prismatic mold with a monomer or oligomer. The polymerization of the monomer or oligomer can be initiated by radiation, e.g., ultraviolet radiation.

In some embodiments, the array of retroreflective cube-corner elements can be formed by methods such as those disclosed in U.S. Pat. No. 3,684,348, issued to Rowland on Aug. 15, 1972; U.S. Pat. No. 3,689,346, issued to Rowland on Sep. 5, 1972; U.S. Pat. No. 3,811,983, issued to Rowland on May 21, 1974; U.S. Pat. No. 3,830,682, issued to Rowland on Aug. 20, 1974; U.S. Pat. No. 3,975,083, issued to Rowland on Aug. 17, 1976; U.S. Pat. No. 4,332,847, issued to Rowland on Jun. 1, 1982; U.S. Pat. No. 4,801,193, issued to Martin on Jan. 31, 1989; U.S. Pat. No. 5,229,882, issued to Rowland on Jul. 20, 1993; U.S. Pat. No. 5,236,751, issued to Martin, et al. on Aug. 17, 1993; U.S. Pat. No. 5,264,063, issued to Martin on Nov. 23, 1992; U.S. Pat. No. 5,376,431, issued to Martin on Dec. 27, 1994; U.S. Pat. No. 5,491,586, issued to Phillips on Feb. 13, 1996; U.S. Pat. No. 5,512,219, issued to Rowland on Apr. 30, 1996; U.S. Pat. No. 5,558,740, issued to Bernard, et al. on Sep. 24, 1996; U.S. Pat. No. 5,592,330, issued to Bernard on Jan. 7, 1997; and U.S. Pat. No. 5,637,173, issued to Martin, et al. on Jun. 10, 1997. The entire contents of each patent are incorporated herein by reference.

The cube-corner elements of the array can have a length along each cube-side edge, for example, in the range of about 0.0015 to about 0.02 inches (about 0.038 to about 0.51 mm). Preferably, each cube-side edge has a length of about 0.003 to about 0.008 inches (about 0.076 to about 0.2 mm) such as about 0.0035 to about 0.006 inches (about 0.089 to about 0.15 mm). In one embodiment, each cube-side edge has a length of about 0.0035 inches (about 0.089 mm). In other preferred embodiments this structure uses prism of 0.006 inches; however, prisms of from 0.0035-0.006 inches are in the working range.

The thickness of the array in the valleys where the cube-corner elements intersect is preferably sufficiently thin so that the array can crack and split along the valleys when minimal force is applied to the retroreflective structure. In some embodiments, the thickness of the array, which is the distance from the window side to apex of the cube-corner elements, is about 0.001 to about 0.009 inches (about 0.025 to about 0.23 mm) such as about 0.001 to about 0.005 inches (about 0.025 to about 0.13 mm), about 0.001 to about 0.003 inches (about 0.025 to about 0.076 mm), or about 0.0015 to about 0.003 inches (about 0.038 to about 0.076 mm). In one specific embodiment, the thickness of the array is about 0.0017 inches (about 0.043 mm). In this particular embodiment the thickness of the array can be 0.0027 inches. However, prisms of from 0.0017 to 0.0027 inches are in the working range.

In addition to the polyvinyl chloride film, the first and second transparent polymer layers, and the array of retroreflective cube-corner elements, the retroreflective structures of the present invention also include an adhesive. Generally, retroreflective structure 2 includes adhesive 12 underlying array of cube-corner elements 10. "Underlying" refers to the relative orientation of the retroreflective adhesive to the array of cube-corner elements.

Adhesive 12 can be applied to prism facets of the cube-corner elements for adhesion to optional substrate 14. If an adhesive is applied directly to the prism facets, however, the adhesive can cause the surface of the prisms to wet, thereby destroying the air interface and reducing, or even eliminating, the ability of the prisms to retroreflect. As a result, a metallized reflective layer can be first deposited on the surface of the dihedral facets. Examples of suitable materials for forming a reflective layer include, but are not limited to, aluminum, silver, gold, palladium, and combinations thereof. Typically, the reflective layers are formed by sputtering or by vacuum deposition. For example, the cube-corner elements can be vapor deposited with aluminum to create a reflective metal layer. In one embodiment, aluminum is vapor deposited whereby aluminum is heated under a vacuum and aluminum vapor is condensed onto the cube-corner elements to form a aluminum layer, e.g., a continuous aluminum layer. Alternatively, metal lacquers, dielectric coatings and other specular coating materials can be employed to form a reflective layer on the cube-corner elements. The thickness of the metallized reflective layer can be in the range of about 200 to about 600 Angstroms, for example, about 200 to about 500 or about 200 to about 400 Angstroms. In one embodiment, adhesive is applied directly to a metallized reflective layer on the array of retroreflective cube-corner elements. Thus, adhesive 12 can be bonded to the metallized reflective layer.

Adhesive 12 can be selected based on its ability to adhesively bond to both the array of cube-corner elements, e.g., an array of metallized cube-corner elements, and a substrate. In addition, the adhesive should provide enough adhesive strength such that the retroreflective structure does not separate from the substrate. Since the retroreflective structure of the present invention includes a plasticized polyvinyl chloride film, plasticizer migration through the structure can be a concern.

Typically, upon exposure to extended lengths of time and/or temperature, plasticizer will migrate from a plasticized polyvinyl chloride film. Such plasticizer can then enter the adhesive of a retroreflective structure and compromise its adhesive properties. The ability of the adhesive to maintain its adhesive properties after the retroreflective structure is subjected to extended lengths of time and/or temperature is an important consideration. The migration of plasticizer into the adhesive can weaken the adhesive properties such as adhesive and cohesive strength. Furthermore, plasticizer migration can cause shrinkage of the retroreflective structure and affect its dimensional stability.

Accordingly, in one embodiment, adhesive 12 is plasticizer-resistant. In another embodiment, adhesive 12 is also a pressure sensitive adhesive.

Adhesive 12 can include silicone adhesives and/or acrylic adhesives such as, for example, acrylic-based pressure sensitive adhesives or silicone pressure sensitive adhesives. In one preferred embodiment, the adhesive is an acrylic-based adhesive due to acrylic adhesives' generally wide availability and relatively low cost. In general, acrylic adhesives have excellent UV resistance, excellent resistance to non-polar solvents and therefore make an excellent choice for this application. However, not all acrylic adhesives are suitably resistant to plasticizer migration. The compatibility of the adhesive determines the rate of plasticizer migration and the amount of plasticizer migration. In general, a low adhesive polarity is thought to decrease the compatibility with a polar vinyl plasticizer. The polarity can be influenced by the monomers used to manufacture the adhesive. Another method to decrease the plasticizer migration is by crosslinking the adhesive. Crosslinking is thought to decrease plasticizer solubility in the adhesive and thus substantial improves the adhesive's performance. Either or both of these mechanisms for improving plasticizer resistance can be employed in the present invention. In some instances, reducing plasticizer migration into the adhesive has had a dramatic effect on reducing shrinkage of the retroreflective structure.

In one aspect of the invention, the adhesive is selected from the group consisting of plasticizer-resistant silicone adhesives and plasticizer-resistant acrylic adhesives. In one preferred embodiment, the adhesive is a crosslinked plasticizer-resistant acrylic adhesive. In another embodiment, the adhesive has a low polarity as compared to the plasticizer present in the polyvinyl chloride film.

One example of a suitable adhesive was obtained from Scapa North America, (Unifilm UV201; Windsor, Conn.). Another example of a suitable adhesive was obtained from Syntac Coated Products, LLC (Product No. 06-1313D; Bloomfield, Conn.). Product No. 06-1313D from Syntac is a blend of high cohesive strength acrylic adhesive and a acrylic adhesive with good adhesive strength.

The thickness of the adhesive can be, for example, about 0.002 in. (about 0.051 mm) to about 0.008 in. (about 0.2 mm) such as about 0.002 in. (0.051 mm) to about 0.006 in. (about 0.15 mm), about 0.002 in. (0.051 mm) to about 0.005 in. (0.13 mm), about 0.001 in. (about 0.025 mm) to about 0.003 in. (about 0.076 mm), or about 0.002 inches (about 0.051 mm).

In some instances, the retroreflective structure can also include a printing ink, such as an opaque white printing ink. A printing ink can be included in the retroreflective structures, for example, to help achieve appropriate Cap Y to meet industry whiteness specifications. Printing ink can be applied, for example, between polyvinyl chloride film 4 and second transparent polymer layer 8. Alternatively, printing ink can be applied between the second transparent polymer layer and the array of retroreflective cube-corner elements. For example, printing ink can be applied between second transparent polymer layer 8 and array of retroreflective cube-corner elements 10. Printing ink can enhance Cap Y performance, however, it also can reduce the retroreflectivity of the prisms it covers. Therefore, the printing ink is often non-continuous. The printing ink can take various forms. For example, the printing ink can be in the form of a pattern, logo, lettering, etc. In some embodiments, the printing ink has been applied using a screen printing method.

In some embodiments, a retroreflective structure includes a transparent plasticized polyvinyl chloride film having a first side and a second side; a first transparent polymer layer overlying the first side of the plasticized polyvinyl chloride film; a second transparent polymer layer overlying the second side of the plasticized polyvinyl chloride film; a non-continuous white opaque printed layer between the transparent plasticized polyvinyl chloride film and the second transparent polymer layer or between the second transparent polymer layer and an array of retroreflective cube-corner elements; the array of retroreflective cube-corner elements underlying the white opaque printed layer; and a plasticizer resistant adhesive underlying the array of retroreflective cube-corner elements.

In another embodiment, retroreflective structures of the present invention include a transparent plasticized polyvinyl chloride film having a first side and a second side; a first transparent polymer layer attached to the first side of the plasticized polyvinyl chloride film; a second transparent polymer layer attached to the second side of the plasticized polyvinyl chloride film; a non-continuous white opaque printed layer between the transparent plasticized polyvinyl chloride film and the second transparent polymer layer or between the second transparent polymer layer and an array of retroreflective cube-corner elements; the array of retroreflective cube-corner elements underlying the white opaque printed layer; a metallized reflective layer formed on the retroreflective cube-corner elements, and a plasticizer-resistant adhesive bonded to the metallized reflective layer.

Suitable transparent plasticized polyvinyl chloride films, transparent polymer layers, arrays of retroreflective cube-corner elements, metallized reflective layers, and plasticizer-resistant adhesive, are described supra.

In one aspect, the present invention includes a transparent plasticized polyvinyl chloride film having a first side and a second side; a first transparent polymer layer overlying the first side of the plasticized polyvinyl chloride film; a second transparent polymer layer overlying the second side of the plasticized polyvinyl chloride film; an array of retroreflective cube-corner elements underlying the second transparent polymer layer; a polymeric film layer sealed through the array of cube-corner elements to the second transparent polymer layer. Sealing is provided through both the prisms and the transparent polymer layer down to the transparent plasticized PVC film.

A plasticizer resistant adhesive is then bonded to the polymeric film layer. The polymeric film layer can be, for example, a plasticized polyvinyl chloride film. The composition of such a polymeric film layer can be similar to transparent plasticized polyvinyl chloride film 4 described supra. Polymeric film layer, however, can be transparent or opaque. Polymeric film layer can be sealed through the array of cube-corner elements to the second transparent polymer layer through techniques such as, for example, radio frequency or ultrasonic sealing or welding. In some embodiments, such a polymeric film layer can eliminate any need for metallization of the array of retroreflective cube-corner elements.

The retroreflective structures of the present invention can also include a substrate bonded to the adhesive. The substrate can include any surface to which it is desired to attach a retroreflective structure including, but not limited to, fabrics, metals, plastics, and wood.

A method for manufacturing a conformable retroreflective structure includes attaching first and second transparent polymer layers on the first and second sides of a transparent plasticized polyvinyl chloride film. In one embodiment, a radiation-curable transparent polymer layer formulation is applied to the plasticized polyvinyl chloride film and the formulation is cured using radiation, e.g., ultraviolet radiation. Optionally, a non-continuous white opaque printing ink can be sandwiched between a transparent polymer layer and the plasticized polyvinyl chloride film or can be sandwiched between the second transparent polymer layer and the array of retroreflective cube-corner elements. Then, the array of retroreflective cube-corner elements can be positioned to underlie to one of the transparent polymer layers. In some embodiments, a metallized reflective layer is deposited on the array of retroreflective cube-corner elements. Finally, a plasticizer-resistant adhesive is applied to underlie the array of retroreflective cube-corner elements. For example, a plasticizer-resistant adhesive can be applied to a metallized reflective layer.

In another method for manufacturing a retroreflective structure, a first transparent polymer layer, e.g., a radiation-cured transparent polymer layer, is applied to a first side of a transparent plasticized polyvinyl chloride film. Then, a second transparent polymer layer, e.g., a radiation-cured transparent polymer layer, is applied to a second side of a transparent plasticized polyvinyl chloride film. A non-continuous white opaque printing ink can then be attached to the second transparent polymer layer. An array of retroreflective elements with a metallized reflective layer can be then attached to underlie the white opaque printing ink. Lastly, a plasticizer-resistant adhesive is coated over the metallized reflective layer.

EXAMPLE 1

A 0.01 in. (about 0.25 mm) plasticized polyvinyl chloride film was coated with a 0.0007 in. (about 0.018 mm) radiation-cured polymer on its first side. The formulation of the coating included 53.3 weight percent (wt %) of a linear polyether urethane acrylate prepolymer with 2.4 functionality and a viscosity of 150,000 cP at 50° C.; 10 wt % of an ethoxylated-3-trimethylolpropane triacrylate; 28.5 wt. % isobornyl acrylate; 5 wt % 1-hydroxy-cyclohexyl-phenyl-ketone photoinitiator; and 3.2 wt % of a photoinitiator consisting of a blend of 50 wt % 2, 4-6-trimethylbenzoyl-diphenyl-phoshineoxide and 50 wt % 2-hydroxy-2-methyl-1-phenyl-propan-1-one. Additionally, the film was coated with a second 0.0007 in. (about 0.018 mm) radiation-cured coating (the same coating formulation as mentioned previously) on the side opposite the first side. A non-continuous pattern of radiation cured screen print layer was attached to the second radiation-cured coating. An array of retroreflective cube corner elements was attached to the radiation-cured screen print layer. A layer of metallized aluminum was attached to the retroreflective cube-corner elements. A plasticizer resistant acrylic based adhesive with a thickness of 0.002 in. (about 0.051 mm) was applied to the metallized retroreflective cube-corner elements. The laminated sample was cut to dimensions of roughly 8-inches by 8-inches (about 20 centimeters (cm) by 20 cm). The sample was adhesively laminated to an aluminum panel by using a pressure of 25-lbs/linear inch The sample was measured for dimension in both coordinates, labeled the machine direction ("MD") and the transverse direction ("TD"). The laminated sample was then placed in a 150° F. (about 66° C.) oven and the dimensions were measured at time intervals of 14 days, 21 days, and 28 days. Table 1 shows the percentage change in dimension for the machine direction ("MD") and the transverse direction ("TD").

TABLE 1

| | 14-days (MD) | 14-days (TD) | 21-days (MD) | 21-days (TD) | 28-days (MD) | 28-days (TD) |
|---|---|---|---|---|---|---|
| Percent Change in Dimension | 0.18% | 0.24% | 0.37% | 0.24% | 0.37% | 0.36% |

After approximately 28 days of 150° F. (about 66° C.) heat exposure, the retroreflective structure exhibited a low degree of shrinkage.

EXAMPLE 2

A 0.01 in. (about 0.25 mm) plasticized polyvinyl chloride film was coated with a 0.0006 in. (about 0.015 mm) radiation-cured polymer on its first side. The formulation of the coating included 55.3 weight percent (wt %) of a linear polyether urethane acrylate prepolymer with 2.4 functionality and a viscosity of 150,000 cP at 50° C. and a molecular weight of between 2000 and 4000 grams per mole; 3 wt % of an dipentaerythritol pentaacrtyle; 36.7 wt. % isobornyl acrylate; 3 wt % 1-hydroxy-cyclohexyl-phenyl-ketone photoinitiator; and 2 wt % of a photoinitiator consisting of a blend of 50 wt % 2,4-6-trimethylbenzoyl-diphenyl-phoshineoxide and 50 wt % 2-hydroxy-2-methyl-1-phenyl-propan-1-one. Additionally, the film was coated with a second 0.0006 in. (about 0.015 mm) radiation-cured coating (the same coating formulation as mentioned previously) on the side opposite the first side. An array of retroreflective cube corner elements was attached to the second radiation-cured screen coating layer. A plasticizer resistant acrylic based adhesive with a thickness of 0.002 in. (about 0.051 mm) was applied to the retroreflective cube-corner elements. The laminated sample was cut to dimensions of roughly 95 mm×95 mm (about 3.74 inches (in) by 20 in). The sample was adhesively laminated to a Ford waterbased painted steel panel utilizing a Ford waterbase paint system by using a pressure of 73-lbs/square inch [3,495 Pa]. The sample was measured for dimension in both coordinates, labeled the machine direction ("MD") and the transverse direction ("TD"). The laminated sample was then placed in a 150° F. (about 66° C.) oven and the dimensions were measured after 8-days. Table 1 shows the percentage change in dimension for the machine direction ("MD") and the transverse direction ("TD").

EXAMPLE 3

The same as example 1 except the plasticized polyvinyl chloride film was coated on both surfaces with a different formulation. The formulation of the coating included 65 weight percent (wt %) of a linear polyether urethane acrylate prepolymer with 2.0 functionality and a viscosity of 35,000 cP at 50° C. and a molecular weight of less than 2000 grams/mole; 30 wt. % of isobornyl acrylate; 3 wt % 1-hydroxy-cyclohexyl-phenyl-ketone photoinitiator; and 2 wt % of a photoinitiator consisting of a blend of 50 wt % 2, 4-6-trimethylbenzoyl-diphenyl-phoshineoxide and 50 wt % 2-hydroxy-2-methyl-1-phenyl-propan-1-one.

COMPARATIVE EXAMPLE 1

The same as example 1 except the plasticized polyvinyl chloride film was not coated on both surfaces.

| | 8-days (MD) | 8-days (TD) |
|---|---|---|
| Example 1 | 0.32% | 0.26% |
| Example 2 | 0.39% | 0.29% |
| Comparative Example 1 | 1.10% | 1.00% |

It can be seen from the examples that the addition of the radiation cured coatings to the retroreflective structure reduces the amount of shrinkage of the structure significantly. It was unanticipated that that the radiation cured polymer coating would reduce the overall shrinkage of the structure.

While this invention has been particularly shown and described with references to example embodiments thereof, it will be understood by those skilled in the art that various changes in form and details may be made therein without departing from the scope of the invention encompassed by the appended claims.

What is claimed is:
1. A conformable retroreflective structure, comprising:
 a) a transparent plasticized polyvinyl chloride film having a first side and a second side;
 b) a first transparent polymer layer overlying the first side of the plasticized polyvinyl chloride film;
 c) a second transparent polymer layer overlying the second side of the plasticized polyvinyl chloride film;
 d) an array of retroreflective cube-corner elements underlying the second transparent polymer layer; and e) a plasticizer-resistant adhesive underlying the array of retroreflective cube-corner elements, and further including an opaque layer of ink.

2. The retroreflective structure of claim 1 wherein the opaque layer of ink is non-continuous.

3. The retroreflective structure of claim 1 wherein the opaque layer of ink lies between the transparent plasticized polyvinyl chloride film and the second transparent polymer layer.

4. The retroreflective structure of claim 1 wherein the opaque layer of ink lies between the transparent plasticized polyvinyl chloride film and the array of retroreflective cube-corner elements.

5. A method for manufacturing a conformable retroreflective structure, comprising:
   a) attaching a first transparent polymer layer on a first side of a transparent plasticized polyvinyl chloride film;
   b) attaching a second transparent polymer layer on a second side of the transparent plasticized polyvinyl chloride film;
   c) positioning an array of retroreflective cube-corner elements to underlie the second transparent polymer layer; and
   d) applying a plasticizer-resistant acrylic adhesive to underlie the array of retroreflective cube-corner elements, and further including sandwiching an opaque layer of ink between the first transparent polymer layer or the second transparent polymer layer and the transparent plasticized polyvinyl chloride film.

6. A method for manufacturing a conformable retroreflective structure, comprising:
   a) attaching a first transparent polymer layer on a first side of a transparent plasticized polyvinyl chloride film;
   b) attaching a second transparent polymer layer on a second side of the transparent plasticized polyvinyl chloride film;
   c) positioning an array of retroreflective cube-corner elements to underlie the second transparent polymer layer; and
   d) applying a plasticizer-resistant acrylic adhesive to underlie the array of retroreflective cube-corner elements, and further including sandwiching an opaque layer of ink between the second transparent polymer layer and the array of retroreflective cube-corner elements.

* * * * *